US010796660B2

(12) United States Patent
Kim et al.

(10) Patent No.: US 10,796,660 B2
(45) Date of Patent: Oct. 6, 2020

(54) CONTENT ADAPTIVE DISPLAY INTERFACE

(71) Applicant: Samsung Display Co., Ltd., Yongin-si, Gyeonggi-do (KR)

(72) Inventors: Kyunglok Kim, Belmont, CA (US); Amir Amirkhany, Sunnyvale, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 18 days.

(21) Appl. No.: 16/243,968

(22) Filed: Jan. 9, 2019

(65) Prior Publication Data

US 2020/0118516 A1 Apr. 16, 2020

Related U.S. Application Data

(60) Provisional application No. 62/745,125, filed on Oct. 12, 2018.

(51) Int. Cl.
*G09G 5/00* (2006.01)

(52) U.S. Cl.
CPC ....... *G09G 5/006* (2013.01); *G09G 2330/023* (2013.01); *G09G 2340/02* (2013.01); *G09G 2350/00* (2013.01); *G09G 2370/00* (2013.01)

(58) Field of Classification Search
None
See application file for complete search history.

(56) References Cited

U.S. PATENT DOCUMENTS 6,072,830 A * 6/2000 Proctor .................. G06T 9/008
375/240.22
6,259,739 B1 7/2001 Kondo
(Continued)

FOREIGN PATENT DOCUMENTS

| EP | 2205029 A1 | 7/2010 |
|---|---|---|
| KR | 2009-0129064 A | 12/2009 |
| WO | 2001-045426 A1 | 6/2001 |

OTHER PUBLICATIONS

EPO Extended Search Report dated Dec. 10, 2019, for corresponding European Patent Application No. 19188467.5 (13 pages).

(Continued)

*Primary Examiner* — Jeffrey J Chow
(74) *Attorney, Agent, or Firm* — Lewis Roca Rothgerber Christie LLP

(57) ABSTRACT

Provided is a method of reducing power consumption by a display device including an encoder for receiving a stream of data, and for compressing the data, a TX rate-buffer for receiving and storing the compressed data, a PHY for receiving the compressed data, a RX rate-buffer for receiving and storing the compressed data, and a decoder for receiving the compressed data, and for decompressing the compressed data to reconstruct original data, the method including placing the PHY a SLEEP state to reduce power consumption of the PHY when the TX rate-buffer transmits a last bit of the compressed data in the TX rate-buffer to the PHY, and placing the PHY in a TRANSMIT/ACTIVE state when a fullness of the TX rate-buffer reaches a reference threshold, or a last bit of compressed data corresponding to a last pixel of a line of pixels is placed in the TX rate-buffer.

20 Claims, 5 Drawing Sheets

(56) References Cited

U.S. PATENT DOCUMENTS

| | | | |
|---|---|---|---|
| 6,674,797 B1* | 1/2004 | Golin | H04N 21/23406 375/240.01 |
| 2007/0040917 A1* | 2/2007 | Kobayashi | H04N 19/197 348/222.1 |
| 2009/0213935 A1 | 8/2009 | van der Laan et al. | |
| 2009/0310673 A1 | 12/2009 | Chung | |
| 2012/0069909 A1* | 3/2012 | Tsukuda | H04N 19/176 375/240.24 |
| 2013/0238922 A1 | 9/2013 | Ling et al. | |
| 2015/0082064 A1* | 3/2015 | Sinha | H04W 52/0251 713/323 |
| 2016/0073116 A1 | 3/2016 | Matsunobu et al. | |
| 2016/0286220 A1 | 9/2016 | Stolitzka et al. | |
| 2016/0358527 A1* | 12/2016 | Bae | G09G 3/2096 |
| 2017/0264820 A1* | 9/2017 | Shibayama | H04N 19/149 |
| 2018/0070086 A1* | 3/2018 | Hasegawa | A61B 1/045 |

OTHER PUBLICATIONS

VESA (Video Electronics Standards Association); VESA Display Stream Compression (DSC) Standard; v1.2; Jan. 20, 2016; pp. 1-146.

* cited by examiner

CONTENT ADAPTIVE DISPLAY INTERFACE

CROSS-REFERENCE TO RELATED APPLICATION(S)

This patent application claims priority to, and the benefit of, U.S. Provisional Patent Application No. 62/745,125 entitled CONTENT ADAPTIVE DISPLAY INTERFACE, filed on Oct. 12, 2018, the entire contents of which are incorporated herein by reference.

FIELD

One or more aspects of embodiments of the present disclosure relate generally to display systems and display devices, more particularly, to a display interface and an encoder for reducing power consumption associated with data transfer in a display device, and a display device including the same.

BACKGROUND

Conventional displays generally consume the same amount of power regardless of the visual content (e.g., pixel data) that is transferred. This may be true regardless of the level of entropy of the images being displayed.

As an example, FIG. 1 illustrates examples of a high entropy image 110 and a low entropy image 120.

As pixel resolution of displays of display devices increases, suitable interface speeds, or suitable display bandwidth requirements, of the display devices also increase. However, despite increasing interface speeds, power budgets are rarely increased. Accordingly, faster interfaces may be suitably designed with better power efficiency (e.g., by measuring power efficiency in terms of mW/Gbps).

In other words, and for example, to maintain a same power budget, a new generation of display interface that improves the interface data rate by a factor of 2 (i.e., 2×) should be able to transfer data at half the power. Although circuit-level innovations may be useful in reducing power while overcoming potential signal integrity limitations associated with a reduced bit-time, system-level innovations that are tailored to a usage model of the display device may assist in achieving ambitious goals relating to system power specs.

Using mobile displays as an example, a large portion of mobile display usage is associated with internet browsing and other simple display functions. Accordingly, using characteristics associated with image redundancies to reduce power may be useful.

For example, if a mostly white computer-generated image is shown on a content-adaptive display (e.g., the low entropy image 120), the content-adaptive display would consume less power (e.g., power consumed in association with transferring, processing, and driving the pixels of the display) than when either a general, natural image or a high-entropy computer-generated image is shown on the content-adaptive display.

This power reduction may be achieved by using compression techniques, which deploy spatial redundancy relating to correlation(s) of respective pixels within a same image frame. However, many conventional display systems apply the same compression ratio to all images regardless of a level of complexity of the images (e.g., whether the high entropy image 110 or the low entropy image 120 is displayed). As a result, interface power consumed by conventional display devices is generally consistent, and is independent of the content of the image being compressed.

It should be noted that information disclosed in this Background section is only for enhancement of understanding of the embodiments of the present disclosure and may include technical information acquired in the process of achieving the inventive concept. Therefore, it may contain information that does not form prior art.

SUMMARY

Embodiments described herein provide improvements to the field of display devices by providing a display system capable of reducing an amount of power consumed according to a level of entropy of an image displayed by a display device including the system.

According to one embodiment of the present disclosure, there is provided a display interface of a display device including an encoder for receiving a stream of data, and for compressing the received data to generate compressed data, a transmit (TX) rate-buffer for receiving and storing the compressed data from the encoder, a physical interface (PHY) for receiving the compressed data from the TX rate-buffer, a receive (RX) rate-buffer for receiving and storing the compressed data from the PHY, and a decoder for receiving the compressed data from the RX rate-buffer, and for decompressing the compressed data to reconstructed original data, wherein the PHY is configured to operate according to a burst-mode transmission policy such that the PHY enters a SLEEP state to consume less power when the TX rate-buffer transmits a last bit of the compressed data in the TX rate-buffer to the PHY, and enters an ACTIVE state when a fullness of the TX rate-buffer reaches a reference threshold, or a last bit of compressed data corresponding to a last pixel of a line of pixels is placed in the TX rate-buffer.

The PHY may be a fixed-rate PHY.

The PHY may be configured to transition from the SLEEP state to the ACTIVE state in about 500 ns or less.

The burst-mode transmission policy may prevent underflow of the RX rate-buffer and overflow of the TX rate-buffer.

The encoder may be configured to identify a bit of the stream of data corresponding to the last pixel of a line of pixels, to determine when the last bit of the compressed data is placed in the TX rate-buffer, and to instruct the PHY to enter the ACTIVE state when the encoder determines that the last bit of the compressed data is placed in the TX rate-buffer.

The encoder may be configured to variably select a compression ratio for compressing the received data based on a level of entropy of an image represented by the stream of data.

The encoder may be configured to select a higher compression ratio for compressing the received data when the level of the entropy of the image is lower.

According to another embodiment of the present disclosure, there is provided a method of reducing power consumption by a display interface of a display device including an encoder for receiving a stream of data, and for compressing the data to generate compressed data, a transmit (TX) rate-buffer for receiving and storing the compressed data from the encoder, a physical interface (PHY) for receiving the compressed data from the TX rate-buffer, a receive (RX) rate-buffer for receiving and storing the compressed data from the PHY, and a decoder for receiving the compressed data from the RX rate-buffer, and for decompressing the compressed data to reconstruct original data, the method including operating the PHY according to a burst-mode transmission policy by placing the PHY a SLEEP state to reduce power consumption of the PHY when the TX rate-buffer transmits a last bit of the compressed data in the TX rate-buffer to the PHY, and placing the PHY in a TRANSMIT/ACTIVE state when a fullness of the TX rate-buffer reaches a reference threshold, or a last bit of compressed data corresponding to a last pixel of a line of pixels is placed in the TX rate-buffer.

The method may further include transmitting the compressed data from the PHY at a fixed-rate.

Placing the PHY in the TRANSMIT/ACTIVE state may include transitioning the PHY from the SLEEP state to the TRANSMIT/ACTIVE state in about 500 ns or less.

Operating the PHY according to the burst-mode transmission policy may prevent underflow of the RX rate-buffer and overflow of the TX rate-buffer.

The method may further include identifying a bit of the stream of data corresponding to the last pixel of the line of pixels, monitoring when the last bit of the compressed data is placed in the TX rate-buffer, and instructing the PHY to enter the TRANSMIT/ACTIVE state upon confirming that the last bit of the compressed data is placed in the TX rate-buffer.

The method may further include variably selecting a compression ratio for compressing the received data based on a level of entropy of an image represented by the stream of data.

The method may further include selecting a higher compression ratio for compressing the received data when the level of the entropy of the image is lower.

According to yet another embodiment of the present disclosure, there is provided an encoder of a display interface of a display device for receiving a stream of data, for compressing the received data to generate compressed data, and for transmitting the compressed data, the encoder being configured to identify a bit of the stream of data corresponding to a last pixel of a line of pixels, determine when the last bit of the compressed data is placed in a TX rate-buffer coupled to the encoder, and instruct a PHY that is configured to receive the transmitted compressed data to transition to a TRANSMIT/ACTIVE state from a SLEEP state when the encoder determines that the last bit of the compressed data is placed in the TX rate-buffer.

The encoder may include a Display Stream Compression (DSC) encoder.

The encoder may be configured to select a higher compression ratio for compressing the received data when a level of entropy of an image is lower such that a decoder is able to receive and decompress the compressed data that is compressed by the encoder with the higher compression ratio in accordance with Display Stream Compression (DSC) standard.

The encoder may be configured to transmit the compressed data to a transmit (TX) rate-buffer.

The encoder may include a plurality of balance FIFOs each configured to generate and store an end-of-line (EOL) MuxWord, and to transfer the EOL MuxWord to the TX rate-buffer, and an EOL tracker configured to notify the TX rate-buffer when all EOL MuxWords are stored in the TX rate-buffer, wherein the TX rate-buffer is configured to initiate transmission through the PHY upon receiving the EOL MuxWords from all of the balance FIFOs. A MuxWord is a fixed-length of packetized bits from a compressed data stream.

The encoder may include a plurality of balance FIFOs each configured to generate and store an end-of-line (EOL) MuxWord, and to transfer the EOL MuxWord to the TX rate-buffer, and an EOL tracker configured to monitor a remaining number of the MuxWords when an EOL MuxWord is placed inside each of the balance FIFOs, and to indicate the remaining number of the MuxWords to the TX rate-buffer, wherein the TX rate-buffer is configured to initiate transmission through the PHY based on a target index corresponding to a sum of the remaining number of the MuxWords and a current number of MuxWords in the TX rate-buffer, in order to flush all the EOL MuxWords inside the TX rate-buffer when a burst of the transmission through PHY is initiated.

Accordingly, the system of embodiments of the present disclosure is able to reduce power associated with data transfer for simpler (e.g., lower entropy) images.

BRIEF DESCRIPTION OF THE DRAWINGS

These and/or other aspects will become apparent and more readily appreciated from the following description of the embodiments, taken in conjunction with the accompanying drawings, in which.

DETAILED DESCRIPTION

A content-adaptive display is a display that is able to adjust its overall power consumption based on a level of complexity (e.g., a level of entropy) of the image transferred and generated by the display. The concept of a content-adaptive display interface (e.g., a display device that is capable of content-adaptive power savings associated with power consumed by its display interface) is a subset of the general concept of content-adaptive displays, which may achieve power savings associated with other power-consuming components or aspects of the display device.

Figure 1:
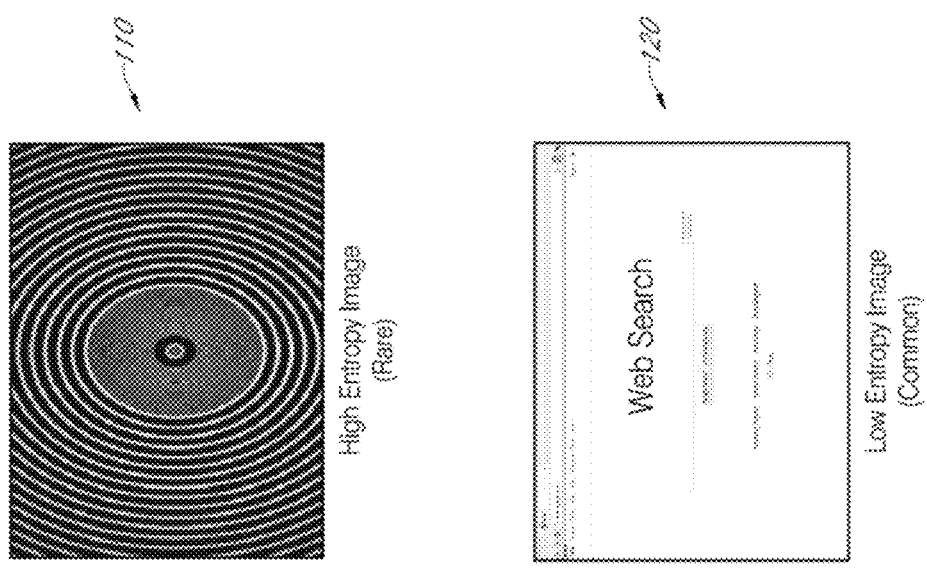
FIG. 1 illustrates examples of a high entropy image and a low entropy image.

As mentioned above, in a conventional display device, during operation, the display may generally consume the same amount of power regardless of the type of image being shown. That is, the display may consume the same power regardless of whether the high entropy image 110 or the low entropy image 120 of the example of FIG. 1 is displayed by the display panel, noting that a lower entropy image may refer to an image in which a relatively large amount of pixels (e.g., consecutive pixels) of the display panel produce a same image (e.g., during an image frame).

Further, a conventional display device may consume the same amount of power associated with the transfer of data (e.g., pixel data) regardless of the content being processed. However, if an image has a relatively high amount of redundancy (e.g., the low entropy image 120), it may be suitable to provide a method for reducing an amount of power consumed by the display logic in association with the data transfer.

Accordingly, it may be suitable to develop a display device that includes a system capable of regulating energy consumption by the display device according to a level of entropy of an image displayed based on analysis of received pixel data.

To achieve improved (e.g., reduced) power consumption by a display device, embodiments of the present disclosure provide a display interface capable of lowering power associated with data transfer for simpler/lower entropy images by providing a novel method for reducing power consumed in association with the display interface. For example, when an image displayed by a display panel has a relatively large degree of redundancy, embodiments of the present disclosure are able to reduce power consumed by the physical interface (PHY) by implementing a burst-mode transmission policy that selectively turns the PHY on and off according to the level of entropy of the image associated with the data transmitted by the PHY.

The level of entropy of an image to be displayed may be determined by examining the pixel data corresponding to the pixels that collectively form the image. If the pixel data corresponding to consecutive pixels is repetitive (e.g., if the data of consecutive pixels repeats several times due to the consecutive pixels displaying a same color and a same light intensity), then it can be determined that subsequent pixel data may also be the same. Accordingly, as will be described below, when consecutive pixel data entering a variable-bit rate (VBR) encoder is repetitive, the VBR encoder compresses the data into a very few bits (e.g., as opposed to a fixed number of bits, as is the case with a constant-bit rate (CBR) encoder). Accordingly, the number of bits to be transmitted can be dramatically reduced, such that a memory associated with a pipeline including the PHY may be more quickly flushed.

Display Stream Compression (DSC) standard is widely adopted in mobile displays to reduce the bandwidth requirements of mobile interfaces, and currently supports two modes: constant-bit rate (CBR) and variable-bit rate (VBR). However, few conventional display systems use the VBR mode, as VBR compression is generally associated with a VBR PHY (e.g., a PHY that is able to change its data rate on the fly), the implementation of which potentially being relatively difficult and inefficient.

As a general example, for a complex image (e.g., the high entropy image 110), a conventional display device may apply a given compression ratio (e.g., 3 to 1) to all of the lines (e.g., horizontal lines of pixels) in the image frame, and may transfer a compressed version of the image at a constant-bit rate. A content-adaptive display device according to embodiments of the present disclosure may also compress the complex image at the same compression ratio when the complex image cannot be further compressed without degradation in visual quality.

For a non-complex/simple image (e.g., the low entropy image 120), conventional display systems may still apply the same compression ratio to an entirety of the image. However, although the content-adaptive display interface of the present embodiment may apply a similar compression ratio to the more complex sections of the simple image (e.g., sections of the image that are unable to be further compressed without losses in visual quality), the content-adaptive display interface of the present embodiment is contrastingly able to apply a more aggressive compression scheme to pixel data associated with the simpler areas, or sections, that characterize the simple image.

Figure 2:
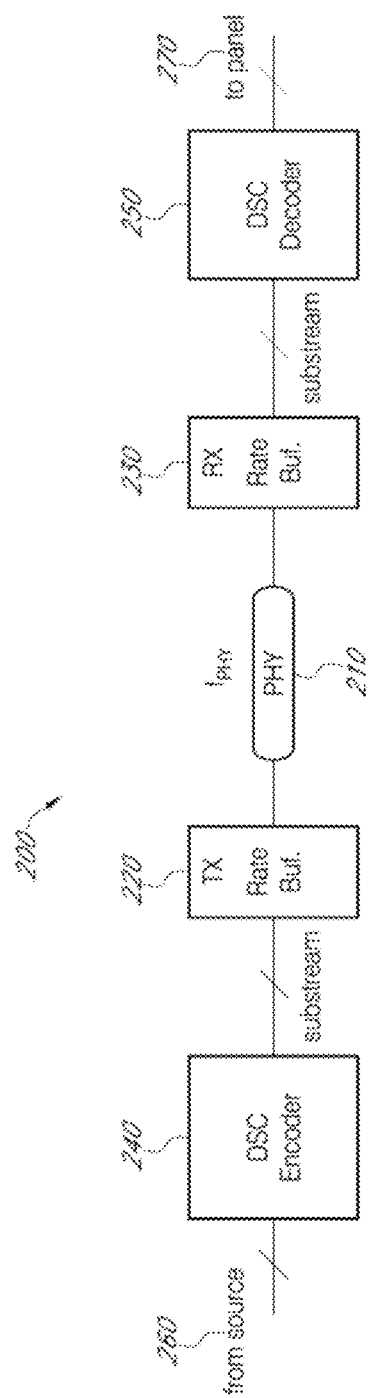
FIG. 2 illustrates a block diagram of a variable-bit rate (VBR) system including a content-adaptive interface, according to an embodiment of the present disclosure.

FIG. 2 illustrates a block diagram of a variable-bit rate (VBR) system including a content-adaptive interface, according to an embodiment of the present disclosure.

Referring to FIG. 2, for the simple sections of the simple, low entropy image, the content-adaptive display interface 200 of the present embodiment may turn off its Physical Interface (PHY) 210 during transfer of the compressed image when there is a pause in any new, additional bits to be transferred in between the lines (e.g., during transfer of a simple section consisting of pixels of a same color and brightness corresponding to identical bits). Accordingly, when displaying a low entropy image, or when displaying simple sections associated with an image, once it is determined that a run of associated pixel data is largely repetitive, the content-adaptive display device may turn off the PHY 210 until a time that the PHY 210 is to transmit new, non-repetitive pixel data. Embodiments of the present disclosure, therefore, provide a novel system for achieving reduced power consumption associated with the display interface.

At the physical interface level, the content-adaptive display interface 200 of the present embodiment includes a fixed-rate PHY 210 that is configured to be operated according to a burst-mode transmission policy (e.g., as opposed to the more-difficult-to-implement VBR PHY). The PHY 210 may have a relatively very fast sleep-to-active (e.g., fast off-to-on) transition capability (e.g., in comparison to a line time of the pipeline corresponding to an amount of time for a horizontal line of pixel data to pass through the pipeline). Further, the PHY 210 may consume a negligible amount of power when in an OFF state.

At the system level, the present embodiment may use a variable-bit-rate (VBR) compression algorithm in association with the fixed-rate PHY 210. The VBR compression algorithm for compressing the image data may adjust the compression ratio based on the content being compressed. That is, image data corresponding to simpler images may be compressed using a larger compression ratio (e.g., in accordance with the VESA DSC standard). However, the VBR compression algorithm may also be augmented with a PHY transmission policy (e.g., a burst-mode transmission policy) that enables the use of VBR compression with the fixed-rate PHY 210 while reducing display interface power consumption by as much as 50% (e.g., for images associated with frequently-viewed content on mobile display systems). Accordingly, by selectively turning on and powering down the PHY 210, the PHY 210 may be operated as a burst-mode PHY 210.

The VBR compression algorithm may have the same latency and buffering requirements as a conventional display system having a standard DSC CBR implementation, yet may objectively achieve equal image quality. Accordingly, the display system of embodiments of the present disclosure may also include a VBR encoder (e.g., DSC encoder) 240 and a VBR decoder (e.g., DSC decoder) 250, along with a standard transmission (TX) rate-buffer 220 and a standard receiver (RX) rate-buffer 230, all of which are discussed further below. Thus, the equivalent functionality of a VBR PHY may be replicated by the present embodiment using a fixed-rate (CBR) PHY 210 with fast off-to-on and on-to-off time, rate-buffers 220, 230 at the transmitter and the receiver, and a burst-mode transmission policy that prevents both underflow of the RX rate-buffer 230 and overflow of the TX rate-buffer 220.

Accordingly, when combined with VBR compression, a VBR interface including the burst-mode PHY 210 with fast sleep-to-active/off-to-on transition time of the present embodiment can achieve significant power reduction over conventional technology (e.g., up to 2.8× lower power for frequently-viewed content on a mobile display device, with about 1.4× power savings resulting from PHY 210 circuit optimization and up to about 2× power savings resulting from combining VBR compression with the fast on-off PHY 210).

From the transmitter side of the content-adaptive display interface 200, which is hereinafter referred to as a VBR interface 200 of the present embodiment, the VBR encoder 240 receives a fixed-rate stream of video from a source 260, encodes, or compresses, the stream of video to generate compressed image data, and then sends the compressed image data to the TX rate-buffer 220. The VBR encoder 240 will continue to fill the TX rate-buffer 220. Accordingly, if the PHY 210 were to fail to sufficiently promptly transfer the compressed image data from the TX rate-buffer 220 to the RX rate-buffer 230, the TX rate-buffer 220 would overflow, thereby causing an error.

Similarly, at the receiver side of the VBR interface 200 of the present embodiment, once the PHY 210 provides the compressed image data to the RX rate-buffer 230, a VBR decoder 250 retrieves the compressed image data from the RX rate-buffer 230, decodes, or decompresses, the compressed image data to generate decompressed video, and provides a fixed-rate stream of the decompressed video to the display pipe and the panel 270 for display of the decompressed video image. The VBR decoder 250 continues to retrieve the decompressed video from the RX rate-buffer 230 in accordance with the rate of the fixed-rate stream. Accordingly, if the PHY 210 were to fail to replenish the compressed image data in the RX rate-buffer 230 sufficiently promptly, the RX rate-buffer 230 would underflow, thereby causing an error.

If implementation of the burst-mode transmission policy is sub-optimal, thereby potentially resulting in overflow and/or underflow errors, the size of the rate-buffers 220, 230 may be increased to avoid the errors, although increasing the size of the rate-buffers 220, 230 adds to gate-count. Furthermore, if implementation of the burst-mode transmission is sub-optimal, the PHY 210 may be turned on and off more frequently to maintain operability, although increased repetition of switching the PHY 210 on and off may sacrifice the power efficiency of the PHY 210 to some degree.

To avoid issues of underflow or overflow, and to minimize rate-buffer size requirements (e.g., the rate-buffers 220, 230 may be implemented to be 1 to 2 lines deep), a smart PHY transmission policy may be implemented at the system level, to control the on-off transitions of the PHY 210 of the present embodiment based on compression operations of the VBR interface 200. Accordingly, the burst-mode transmission policy of the present embodiment enables the VBR interface 200 capable of VBR compression despite including the fixed-rate PHY 210.

The VBR interface 200 of the present embodiment may be quantitatively compared to a conventional CBR interface in terms of power consumption, visual quality, buffer features, and PHY features (e.g., by using a (synthesizable) RTL implementation of the VBR encoder 240 and VBR decoder 250, and by using an RTL model of the PHY 210, which may be an accurate behavioral representation of the PHY 210 of the present embodiment).

Figure 3:
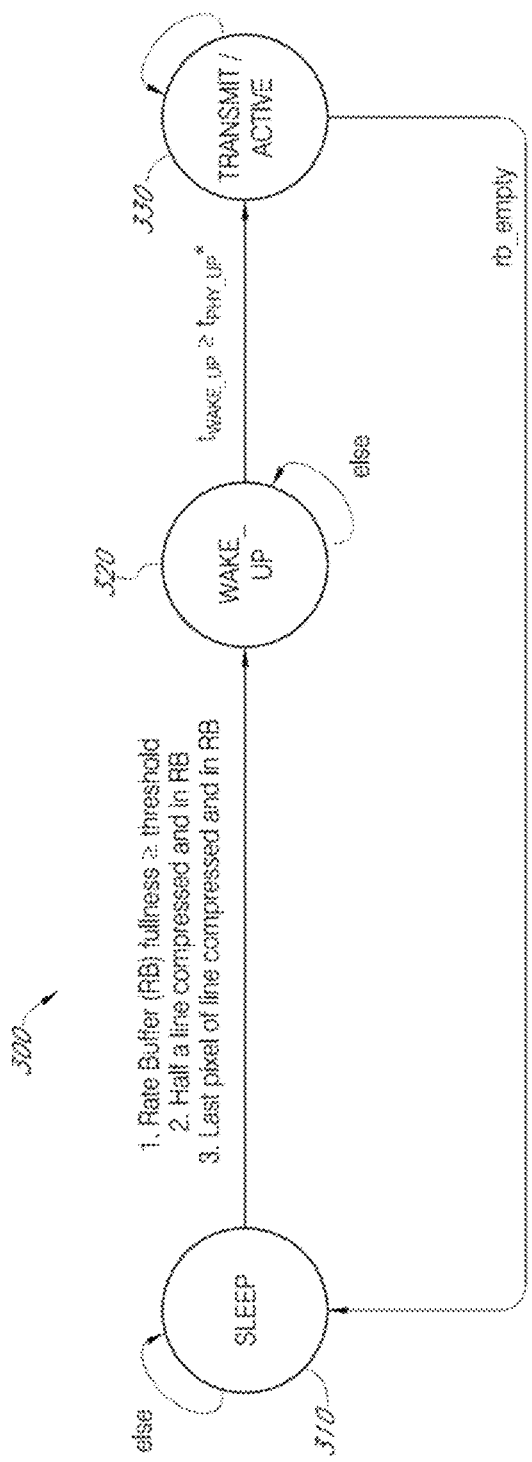
FIG. 3 illustrates a block diagram of a burst-mode transmission policy, according to an embodiment of the present disclosure.

FIG. 3 illustrates a block diagram of a burst-mode transmission policy 300, according to an embodiment of the present disclosure.

Referring to FIG. 3, in the present embodiment, the PHY 210 stays in a SLEEP state (e.g., off state) 310 (e.g., will remain turned off to consume a negligible amount of power) until one of the two conditions is met—the PHY 210 will enter a WAKE UP state (e.g., on state) 320 either if a fullness of the TX rate-buffer 220 exceeds a threshold, or if a last pixel of a line or slice (e.g., a horizontal line of pixels, or a segment/slice including a number of pixels or a number of lines of pixels) is compressed and placed in the TX rate-buffer 220. In another embodiment, the PHY 210 may enter the WAKE UP state 320 once a fraction of a line (e.g., a half of a line) of pixels is compressed and placed in the TX rate-buffer 220.

By entering the WAKE UP state 320 once a fullness of the TX rate-buffer 220 exceeds the threshold, overflow of the TX rate-buffer 220 may be avoided. By entering the WAKE UP state 320, once a last pixel of a line is compressed and placed in the TX rate-buffer 220, the VBR interface 200 may avoid underflow of the RX rate-buffer 230 that may be otherwise caused due to the fact that the VBR decoder 250 is unable to complete decoding/decompressing a line of the compressed image data before it receives the last compressed pixel of a line. That is, although the VBR decoder may wait to begin decompressing a line until after receiving the last compressed pixel of a line (EOL), in the present embodiment the VBR encoder may reduce latency by beginning decompression before receiving the last compressed pixel of the EOL, given that the VBR encoder receives the EOL before completing decompression of the line.

Accordingly, if any of the above conditions is met, the PHY 210 transitions from the SLEEP state 310 to the WAKE UP state 320. In the WAKE UP state 320, the PHY 210 may establish error-free communication between the TX rate-buffer 220 and the RX rate-buffer 230. For the PHY 210 of the present embodiment, the required wake up time to transition from the WAKE UP state 320 to a TRANSMIT/ACTIVE state 330 may be less than about 500 ns.

After transitioning to the TRANSMIT/ACTIVE state 330, the PHY 210 may to begin transmission of compressed image data from the TX rate-buffer 220 through the PHY 210 to the RX rate-buffer 230. Once the PHY 210 starts transmission in the TRANSMIT/ACTIVE state 330, the PHY 210 may continue to transmit the compressed image data until the TX rate-buffer 220 is completely flushed. Thereafter, the PHY 210 transitions back to the SLEEP state 310. When in the SLEEP state 310, the power consumed by the PHY 210 is reduced to a negligible amount.

In other embodiments, to avoid underflow or overflow errors, the transmitter including TX rate-buffer 220 may include a model of the receiver including the RX rate-buffer 230. Accordingly, the transmitter may keep track of how much data it has output, and based on the transmitter's expectation of the operability of the receiver, the transmitter may adjust the rate (e.g., increase or decrease the rate) at which the transmitter transmits data to the PHY 210.

Figure 4:
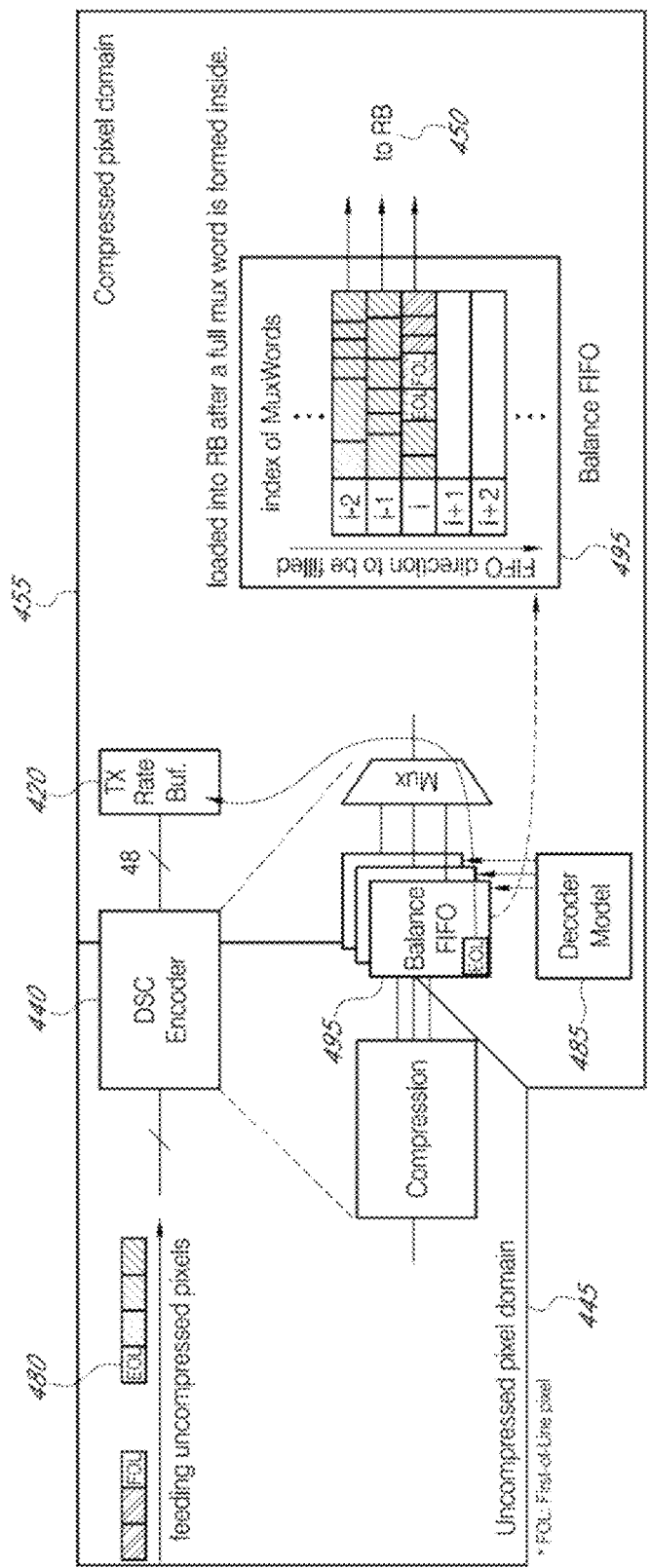
FIG. 4 illustrates a block diagram of a VBR encoder for tracking an end-of-line (EOL) indicator, according to an embodiment of the present disclosure.

FIG. 4 illustrates a block diagram of a VBR encoder 440 for tracking an end-of-line (EOL) indicator, according to an embodiment of the present disclosure.

Referring to FIG. 4, a challenge associated with implementing the above described burst-mode transmission policy is that the compressed data stream in the compressed pixel domain 455 in DSC (VBR) standard does not include an "end of line" (EOL) indicator for indicating the last pixel of the line of compressed data. That is, there is no indication when the last bit of data corresponding to a line of pixels is placed in the TX rate-buffer 420 (e.g., the TX rate-buffer 220 of FIG. 2) by the VBR encoder 440 (e.g., the VBR encoder 240 of FIG. 2). This information may be useful, as the decoder 450 (e.g., the VBR decoder 250 of FIG. 2) is unable to decode a line of pixels until it has received the last pixel of the line.

However, information indicating the EOL 480 is effectively available at the input to the VBR encoder 440 in the uncompressed domain (uncompressed pixel domain) 445 before the image data is compressed by the VBR encoder 440. Accordingly, the VBR encoder 440 of the present embodiment may include logic that tracks the last pixel of a line corresponding to the EOL 480 from when it enters the pipeline of the VBR encoder 440 until when its corresponding compressed word (e.g., "MuxWord" in DSC terminology) is placed in the TX rate-buffer 420. Thus, the VBR encoder 440 of the present embodiment allows the implementation of the above described transmission policy while remaining compliant with DSC standard.

That is, the VBR encoder 440, which may effectively have knowledge of the pipeline, may be aware of the time when a last pixel of a line (e.g., EOL 480) is output from the VBR encoder 440 and when the last pixel of the line is received by the TX rate-buffer 420. As described below, an EOL tracker inside the VBR encoder 440 may monitor the location of EOL MuxWords, and may indicate the time when the EOL MuxWords are popped out from balance FIFOs to be located in the TX rate-buffer 420. Then, once the TX rate-buffer 420 has received the entire line of pixels, the PHY 210 may be turned on to send the compressed image data to the RX rate-buffer 430. In other embodiments, similar indicators for indicating a pixel corresponding to a fraction of a line (e.g., one-half or one-third), and located somewhere in the middle of the line, may be used as an indicator for turning on the PHY 210.

For example, in the uncompressed pixel domain 445, an index of each pixel indicates the location of the pixel on a line stream (e.g., a stream of a horizontal line of pixels). That is, when pixels are fed to the VBR encoder 440, each pixel has a certain index on a line (e.g., if a line consists of 720 pixels, then the first and the last pixel of the line have the indices of 0 and 719, respectively).

However, in the compressed pixel domain 455, the index of each pixel is no longer valid, and generation of a compressed EOL MuxWord containing EOL and a transfer timing of the EOL MuxWord to the TX rate-buffer 420 depends on a level of entropy of the line. That is, once pixels are compressed inside the VBR encoder 440, the original index information associated with the pixels is no longer valid because the degree of compression dynamically changes depending on the complexity (entropy) of pixel images.

In order for VBR decoder 450 in a receiver to not underflow (e.g., for the RX rate-buffer 230 to not underflow), the EOL MuxWord may be transmitted from the transmitter on time. Accordingly, the location of the EOL 480 may be monitored inside VBR encoder 440, and the EOL 480 may be sent once it arrives at the TX rate buffer 420. However, the timing when the EOL MuxWord 480 arrives may vary due to the timing being dependent on the level of entropy of the line.

To monitor the location of the EOL 480 inside the VBR encoder 440, the VBR encoder 440 may include hardware (e.g., an EOL tracker described below with reference to FIG. 5), which may look at multiple (e.g., three or four) balance FIFOs 495 to see when the EOL MuxWords are generated, and to remember the indices at EOL MuxWords in the FIFOs 495. Once a decoder model 485 instructs each of the balance FIFOs 495 to transmit the EOL MuxWord to the TX rate-buffer 420, the EOL tracker may notify the TX rate-buffer 420 that it is an EOL MuxWord that is being transmitted.

Figure 5:
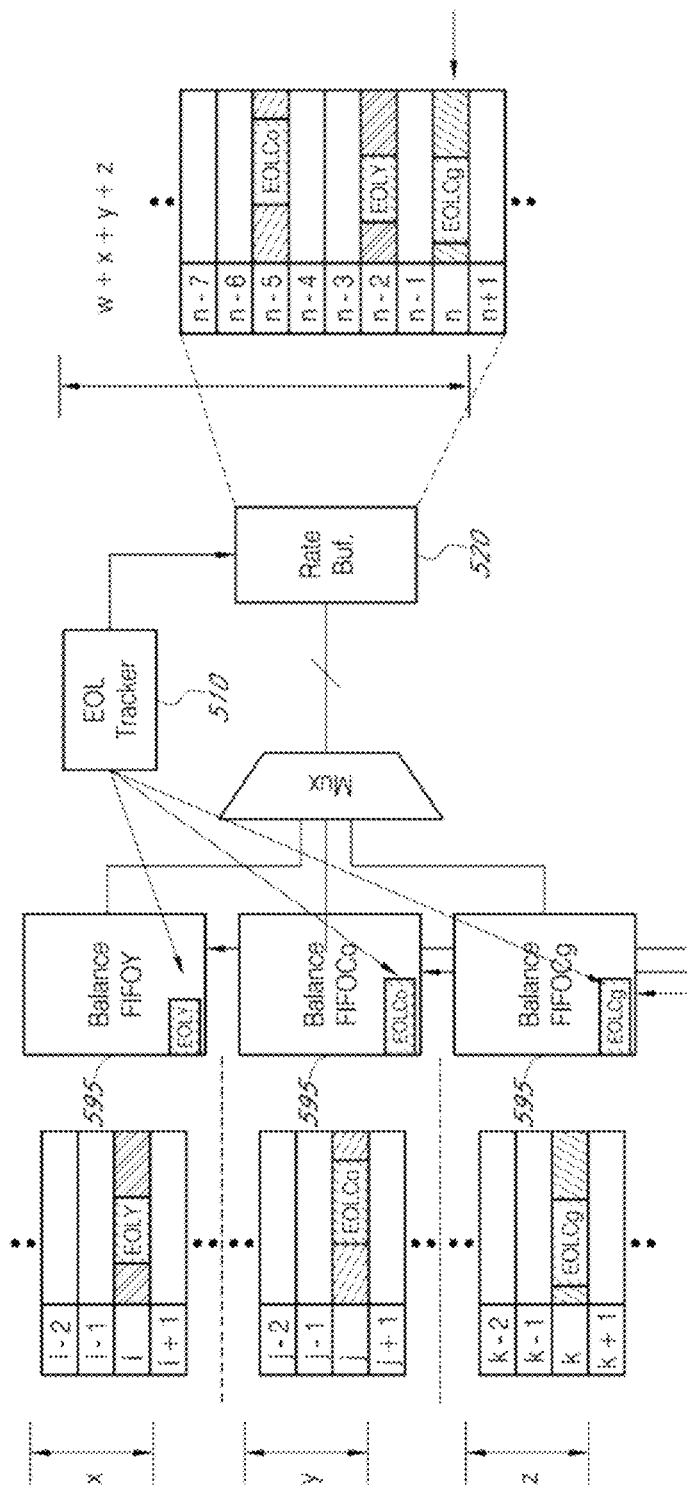
FIG. 5 illustrates a block diagram depicting an example of an operation of an end-of-line (EOL) tracker, according to an embodiment of the present disclosure.

FIG. 5 illustrates a block diagram depicting an example of an operation of an end-of-line (EOL) tracker, according to an embodiment of the present disclosure.

Referring to FIG. 5, balance FIFOs 595 (e.g., FIFOs 495) "FIFOY," "FIFOCo," and "FIFOCg" may generate and store EOL MuxWords at index i, j, and k, respectively. Once the EOL MuxWords are transferred to the TX rate-buffer by the VBR encoder 440, an EOL tracker 510 notifies the TX rate-buffer 520 (e.g., TX rate-buffer 220, 420) that the MuxWords stored to the TX rate-buffer 520 are EOL MuxWords. The TX rate-buffer 520 is able to remember where the EOL MuxWords are located in a buffer table. Once all three EOL MuxWords are stored in the TX rate-buffer 520, the TX rate-buffer 520 may initiate burst-mode transmission through the PHY 210. In the present example, EOL MuxWords for Y, Co, and Cg are located at n-2, n-5, and n. Because pop-out timing from balance FIFOs 595 may vary, the order of the EOL MuxWords may be changed.

According to another embodiment for implementing the EOL tracking method, instead of looking at the exact location of EOL MuxWords, the EOL tracker 510 may monitor a remaining number of MuxWords inside each of the balance FIFOs 595. When the last pixel of a line is compressed and located in the balance FIFOs 595, the EOL tracker 510 indicates to the TX rate-buffer 520 the number of MuxWords remaining in the balance FIFOs 595 (x, y, z). Then, the TX rate-buffer 520 may check the current number of MuxWords remaining within it (w), and may set the target index by adding (w+x+y+z) to the current index to know when to initiate transmission to the PHY 210.

To compare the VBR interface 200 of the disclosed embodiments with a conventional CBR interface, the VBR encoder 240 and the VBR decoder 250 may support both VBR and CBR modes in synthesizable RTL for purposes of comparison. Both RTL implementations are bit-exact versus standard DSC C-models provided by VESA. A functional model of the PHY 210 (e.g., the PHY 210 of the embodiment shown in FIG. 2) may be included in the simulation framework, and power consumption of the PHY 210 may be monitored as images are compressed, transferred, and decompressed through the VBR interface 200.

For example, the VBR interface 200 of the disclosed embodiments can result in up to about 50% power reduction in interface power consumption when off-on transition time of the PHY 210 does not exceed about 500 ns. High power savings (e.g., power savings of about 2×) may be achieved on simple content (e.g., low entropy image 120), while lower power savings (e.g., power savings of about 1.1×) may be achieved on complex, natural images (or high entropy images such as high entropy image 110) due to natural images generally having high entropy due to imaging noise. Accordingly, higher power savings may be achieved with respect to computer-generated graphics and text, while the lesser power savings may be obtained with respect to natural images.

Because the compression algorithm in the VBR interface in the present embodiment is compliant with VESA DSC spec, image quality may also be guaranteed according to the DSC standard. In fact, image quality between the two methods may be approximately identical because the core compression algorithms between the two are the same. For complex images such as "landscape" where VBR achieves the same 3:1 compression ratio as that achieved by CBR, PSNR may be the same. For simpler images, image quality may marginally improve with VBR as the less-optimal mid-point prediction compression mode that protects the buffer from underflow is disabled.

The VBR interface 200 according to the disclosed embodiments may use the same rate-buffers 220, 230 for burst-mode transmission as the rate-buffers that exist in conventional CBR mode display devices. However, buffer size requirements may be different between the two methods, depending on implementation of the disclosed embodiments.

The transmission policy in VBR of the disclosed embodiments may reduce or minimize potential buffer size overhead caused by burst-mode operation. To quantify buffer requirement in both CBR and VBR, the fullness of the rate-buffers may be monitored. Even though buffer size requirement may be different for different images between the two methods, it seems that requirements corresponding to today's hardware specifications are the same between CBR and VBR.

The VBR interface 200 of the disclosed embodiments includes the PHY 210 that is able to transition from a very low power SLEEP mode to a fully-functional TRANSMIT/ACTIVE mode in a short time. If the transition time of the PHY 210 were relatively slow, the rate-buffers 220, 230 would have increased buffer sizes to store the data, and the PHY 210 would have less opportunity to stay in the low-power SLEEP mode. Energy savings achieved by the VBR interface 200 when compared to the CBR interface with about 0, about 250 ns, and about 500 ns wake up time indicate that up to about 500 ns wake-up time has negligible impact on system requirements and performance. Therefore, about 500 ns is a reasonable spec for a forwarded clock system, or for an embedded clock system.

Accordingly, the VBR interface 200 of the described embodiments may achieve 2.8× less power at 2× the data rate compared to conventional display interfaces. The VBR compression algorithm of the described embodiments is compatible with DSC standard, and does not impose any rate-buffer size overhead or latency overhead to standard DSC implementation. Further, the VBR compression algorithm does not change visual quality.

According to the above, embodiment of the present disclosure may provide a display device having increased power efficiency by providing a method for decreasing power consumption by a display interface of the display device during processing of low entropy images. Accordingly, the embodiments described herein provide improvements to the field of display technology.

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described. Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise for example indicated. Accordingly, it will be understood by those of skill in the art that various changes in form and details may be made without departing from the spirit and scope of the present disclosure as set forth in the following claims, with functional equivalents thereof to be included therein.

What is claimed is:

1. A display interface of a display device comprising:
an encoder for receiving a stream of data, and for compressing the received data to generate compressed data;
a transmit (TX) rate-buffer for receiving and storing the compressed data from the encoder;
a physical interface (PHY) for receiving the compressed data from the TX rate-buffer;
a receive (RX) rate-buffer for receiving and storing the compressed data from the PHY; and
a decoder for receiving the compressed data from the RX rate-buffer, and for decompressing the compressed data to reconstructed original data,
wherein the PHY is configured to operate according to a burst-mode transmission policy such that the PHY:
enters a SLEEP state to consume less power when the TX rate-buffer transmits a last bit of the compressed data in the TX rate-buffer to the PHY; and
enters an ACTIVE state when:
a fullness of the TX rate-buffer reaches a reference threshold; or
a last bit of compressed data corresponding to a last pixel of a line of pixels is placed in the TX rate-buffer.

2. The display interface of claim 1, wherein the PHY is a fixed-rate PHY.

3. The display interface of claim 1, wherein the PHY is configured to transition from the SLEEP state to the ACTIVE state in about 500 ns or less.

4. The display interface of claim 1, wherein the burst-mode transmission policy prevents underflow of the RX rate-buffer and overflow of the TX rate-buffer.

5. The display interface of claim 1, wherein the encoder is configured to identify a bit of the stream of data corresponding to the last pixel of a line of pixels, to determine when the last bit of the compressed data is placed in the TX rate-buffer, and to instruct the PHY to enter the ACTIVE state when the encoder determines that the last bit of the compressed data is placed in the TX rate-buffer.

6. The display interface of claim 1, wherein the encoder is configured to variably select a compression ratio for compressing the received data based on a level of entropy of an image represented by the stream of data.

7. The display interface of claim 6, wherein the encoder is configured to select a higher compression ratio for compressing the received data when the level of the entropy of the image is lower.

8. A method of reducing power consumption by a display interface of a display device comprising an encoder for receiving a stream of data, and for compressing the data to generate compressed data, a transmit (TX) rate-buffer for receiving and storing the compressed data from the encoder, a physical interface (PHY) for receiving the compressed data from the TX rate-buffer, a receive (RX) rate-buffer for receiving and storing the compressed data from the PHY, and a decoder for receiving the compressed data from the RX rate-buffer, and for decompressing the compressed data to reconstruct original data, the method comprising:
operating the PHY according to a burst-mode transmission policy by:
placing the PHY a SLEEP state to reduce power consumption of the PHY when the TX rate-buffer transmits a last bit of the compressed data in the TX rate-buffer to the PHY; and
placing the PHY in a TRANSMIT/ACTIVE state when:
a fullness of the TX rate-buffer reaches a reference threshold; or a last bit of compressed data corresponding to a last pixel of a line of pixels is placed in the TX rate-buffer.

9. The method of claim 8, further comprising transmitting the compressed data from the PHY at a fixed-rate.

10. The method of claim 8, wherein placing the PHY in the TRANSMIT/ACTIVE state comprises transitioning the PHY from the SLEEP state to the TRANSMIT/ACTIVE state in about 500 ns or less.

11. The method of claim 8, wherein operating the PHY according to the burst-mode transmission policy prevents underflow of the RX rate-buffer and overflow of the TX rate-buffer.

12. The method of claim 8, further comprising:
identifying a bit of the stream of data corresponding to the last pixel of the line of pixels;
monitoring when the last bit of the compressed data is placed in the TX rate-buffer; and
instructing the PHY to enter the TRANSMIT/ACTIVE state upon confirming that the last bit of the compressed data is placed in the TX rate-buffer.

13. The method of claim 8, further comprising variably selecting a compression ratio for compressing the received data based on a level of entropy of an image represented by the stream of data.

14. The method of claim 13, further comprising selecting a higher compression ratio for compressing the received data when the level of the entropy of the image is lower.

15. An encoder of a display interface of a display device for receiving a stream of data, for compressing the received data to generate compressed data, and for transmitting the compressed data, the encoder being configured to:
identify a bit of the stream of data corresponding to a last pixel of a line of pixels;
monitor when the last bit of the compressed data is placed in a TX rate-buffer coupled to the encoder; and
instruct a PHY that is configured to receive the transmitted compressed data to transition to a TRANSMIT/ACTIVE state from a SLEEP state when the encoder confirms that the last bit of the compressed data is placed in the TX rate-buffer.

16. The encoder of claim 15, wherein the encoder comprises a Display Stream Compression (DSC) encoder.

17. The encoder of claim 15, wherein the encoder is configured to select a higher compression ratio for compressing the received data when a level of entropy of an image is lower such that a decoder is able to receive and decompress the compressed data that is compressed by the encoder with the higher compression ratio in accordance with Display Stream Compression (DSC) standard.

18. The encoder of claim 15, wherein the encoder is configured to transmit the compressed data to a transmit (TX) rate-buffer.

19. The encoder of claim 18, wherein the encoder comprises:
a plurality of balance FIFOs each configured to generate and store an end-of-line (EOL) MuxWord, and to transfer the EOL MuxWord to the TX rate-buffer; and
an EOL tracker configured to notify the TX rate-buffer when all EOL MuxWords are stored in the TX rate-buffer,
wherein the TX rate-buffer is configured to initiate transmission through the PHY upon receiving the EOL MuxWords from all of the balance FIFOs.

20. The encoder of claim of claim 18, wherein the encoder comprises:
a plurality of balance FIFOs each configured to generate and store an end-of-line (EOL) MuxWord, and to transfer the EOL MuxWord to the TX rate-buffer; and
an EOL tracker configured to monitor a remaining number of the MuxWords upon generation of the EOL MuxWord inside each of the balance FIFOs, and to indicate the remaining number of the MuxWords to the TX rate-buffer, wherein the TX rate-buffer is configured to initiate transmission through the PHY based on a target index corresponding to a sum of the remaining number of the MuxWords from each of the balance FIFOs and a current number of MuxWords in the TX rate-buffer.

* * * * *